United States Patent [19]

Idel

[11] 3,802,299
[45] Apr. 9, 1974

[54] BAND SAW SHARPENING MACHINE
[76] Inventor: Vladimir Viktorovich Idel, ulitsa Gertsena, 3, kv. 37, Zavolzhie Gorkocskoi Oblasti, U.S.S.R.
[22] Filed: Feb. 28, 1973
[21] Appl. No.: 336,713

[30] Foreign Application Priority Data
Mar. 9, 1972 U.S.S.R............................ 1752610
Nov. 21, 1972 U.S.S.R............................ 1846251
Mar. 9, 1972 U.S.S.R............................ 1752611

[52] U.S. Cl......................... 76/37, 76/43, 76/47 A, 76/112
[51] Int. Cl............................................ B23d 63/12
[58] Field of Search.......... 76/37, 43, 47 A, 77, 112

[56] References Cited
UNITED STATES PATENTS
3,657,946  4/1972  Idel.................................... 76/43 X
3,611,839  10/1971 Idel....................................... 76/37
3,057,229  10/1962 Oliver.................................... 76/43
2,434,691  1/1948  Fields................................... 76/37
2,379,642  7/1945  Kiechle................................. 76/41

*Primary Examiner*—Leonidas Vlachos

[57] ABSTRACT

A machine the bed of which mounts a grinding wheel head, mechanisms for feeding the saw blade transversely and longitudinally to the grinding wheel, and a resilient fixture for holding the saw blade during the sharpening process. Attached to the fixture are rests for the tips of the saw teeth to bear upon. The front rest, which is located behind the grinding wheel as viewed in the direction of pitch feed, is spring-loaded parallel to the side surfaces of the saw blade, has an inclined pad, which serves the purpose of retarding the saw blade during pitch feed, and is movably mounted on the fixture so as to turn in a plane parallel to the side surfaces of the saw blade, whereby the saw teeth are automatically orientated relatively to the grinding wheel and a finer surface finish can be obtained on the tooth edge being sharpened.

5 Claims, 6 Drawing Figures

BAND SAW SHARPENING MACHINE

The present invention relates to machine-tool construction, more particularly to band saw sharpening machines.

Known in the art are band saw sharpening machines comprising a bed which mounts a grinding mechanism with a grinding wheel provided therein, a mechanism for feeding the saw blade transversely to the grinding wheel and a mechanism for pitch-feeding the saw longitudinally, the feed mechanisms being kinematically interconnected. The band saw sharpening machines mentioned above also have a resilient fixture to clamp the saw blade on its side and back surfaces and to hold it during the sharpening process. Attached to this fixture are rests for the tips of the saw teeth to bear upon.

The front rest, which is located behind the grinding wheel as viewed in the direction of the pitch feed, has a flat inclined pad successively interacting with the tip of each saw tooth during pitch feed in order to retard the saw blade during the pitch-feed motion. Said inclined pad is spring-loaded parallel to the side surfaces of the saw blade and is rotatably mounted so that it can turn square with the direction of the saw blade movement, i.e. the pad pivot pin is installed parallel to the direction of the pitch feed (see, for example, U.S. Pat. No. 3,657,946, Class 76/112).

The machine under discussion suffers from the disadvantage that when setting up the machine the inclined pad of the front rest has to be adjusted very accurately in order to produce the required backward forces acting on the saw blade in the direction opposite to the pitch feed.

It is an object of the present invention to simplify the setting of the front rest needed to produce the required backward forces acting on the saw blade in the direction opposite to the pitch feed.

With this and various other objects in view, there is provided a band saw sharpening machine the bed of which mounts a grinding mechanism with a grinding wheel provided therein, an in-feed mechanism for moving the saw blade transversely to said grinding wheel, which in-feed mechanism is kinematically connected with a pitch-feed mechanism for moving the saw blade longitudinally, and a resilient fixture for clamping the saw blade on the side and back surfaces, to which fixture are attached rests for the tips of the saw teeth to bear upon, the front rest, which is located behind the grinding wheel as viewed in the direction of the pitch feed, being spring-loaded parallel to the side surface of the saw blade and having a pad positioned at an acute angle, in the direction of the pitch feed, to the straight line passing through the tips of the saw teeth, which pad successively interacts with the tip of each tooth in order to retard the saw blade during pitch feed.

According to the invention, the front rest with the pad attached thereto is mounted on said fixture so that the inclination of said pad in the direction of the pitch feed can be changed by the effect of the saw teeth acting thereupon during the saw sharpening process.

It is desirable that the front rest should be made in the form of a lever pivoted on a pin positioned square with the direction of the saw blade movement and supported by a bracket rigidly secured to the fixture, one arm of the lever carrying a movably mounted inclined pad and the other arm being spring-loaded parallel to the side surface of the saw blade.

The front rest of this construction may be used with particular advantage for removing equal amounts of metal from both tooth edges.

It is further desirable that the lever should be mounted so that the length of the arm carrying the inclined pad can be varied. To this end, the bracket should be provided with additional holes to receive the lever pivot pin.

This method of mounting the lever enables the backward force acting on the saw blade to be varied in accordance with the amount of metal to be ground off.

It is also desirable that the front rest should be made in the form of a shaft mounted square with the direction of the saw blade movement and carrying a movably mounted inclined pad.

The front rest of this construction may be used with particular advantage for heavy grinding of the forward edges of the teeth.

As found experimentally, it is advantageous to mound the inclined pad on the rest so that there is an angle from 0°30′ to 15° between the pad and the back edge of the saw tooth.

Setting the angular position of the inclined pad in this range makes it possible to strengthen the surface of the tooth edge and at the same time to improve the finish of this surface.

The band saw sharpening machine constituting the present invention features a simpler adjustment of the front rest, automatically orientates the saw teeth in relation to the grinding wheel and affords a higher surface finish of the saw tooth edges. In addition to these advantages, the machine provides for surface strengthening of the metal on the tooth tips.

Now the invention will be described in detail with reference to the accompanying drawings in which:

FIG. 6 is an enlarged view of a saw tooth.

Figure 1:
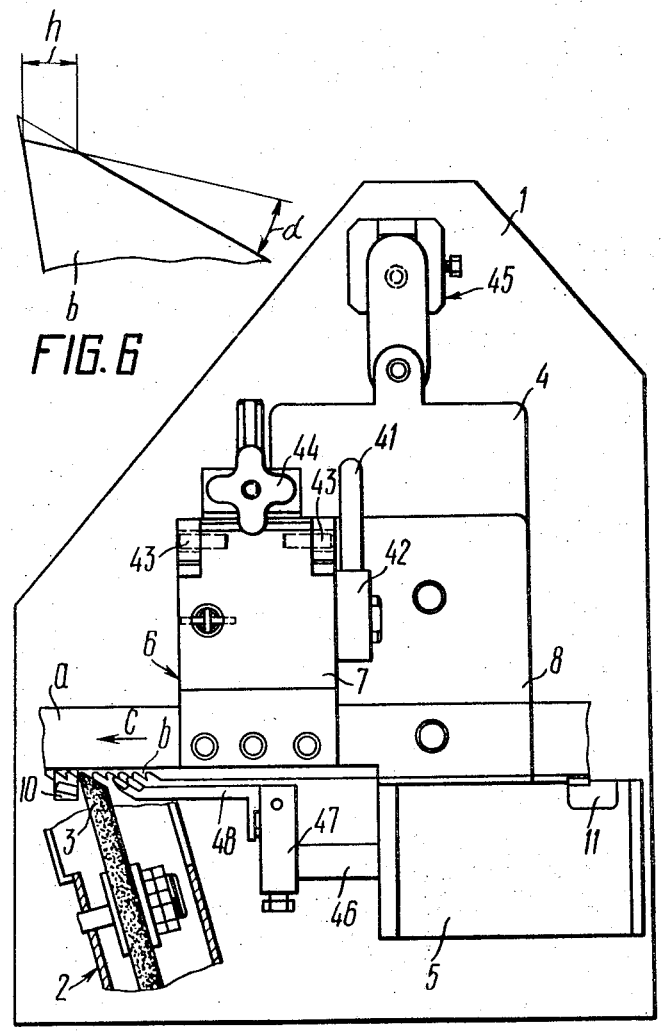
FIG. 1 is a top view of the band saw sharpening machine.

The machine for sharpening the teeth of a band saw blade "a" (FIG. 1) comprises a bed 1 which mounts a grinding mechanism 2 with a grinding wheel 3 provided therein, an infeed mechanism 4 for moving the saw blade transversely "a" to the grinding wheel 3 and a pitch-feed mechanism for moving the saw blade "a" longitudinally, the two feed mechanisms being kinematically interconnected. The bed 1 also mounts a resilient fixture 6 to clamp the saw blade on the side and back surfaces and to hold it during the sharpening process. The fixture 6 consists of two parts, an upper part 7 and a lower part 8. Attached to these parts of the fixture are guides 9 designed to receive and clamp the saw blade "a."

Mounted on the lower part 8 of the fixture 6 are a front rest 10 and a rear rest 11, which are provided for the tips of the saw teeth "b" to bear upon during the sharpening process.

The front rest 10, which is located behind the grinding wheel 3 as viewed in the direction of the pitch feed indicated by the arrow "c," has a supporting element 12 with a pad 13 inclined relatively to the direction of the pitch feed and referred to hereinafter as an inclined pad, which successively interacts with the tip of each tooth "b." The purpose of the pad inclination is to retard the saw blade "a" at high rates of pitch feed and thereby to orientate the saw teeth "b" in relation to the grinding wheel 3. The retardation of the saw blade is effected by the horizontal component of the reaction force arising on the inclined pad 13.

The rest 10 is spaced from the grinding wheel 3 a minimum possible distance approximately equal to one or two pitches of the saw blade "a."

Figure 2:
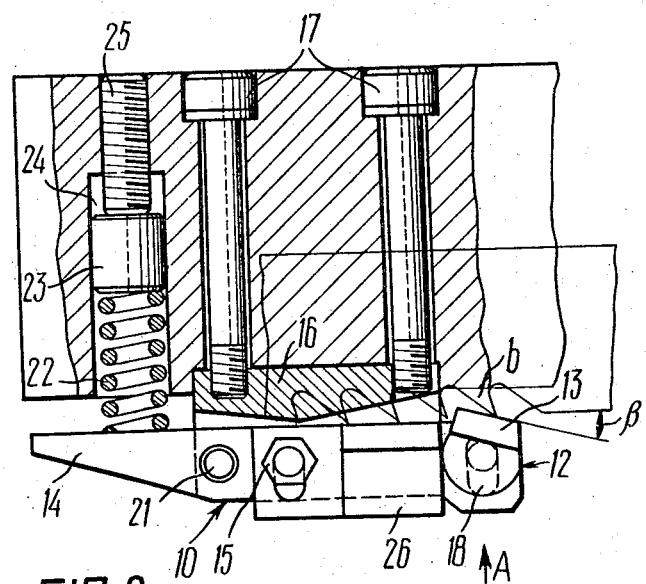
FIG. 2 is an enlarged partially cutaway top view of the first embodiment of the front rest.
Figure 3:
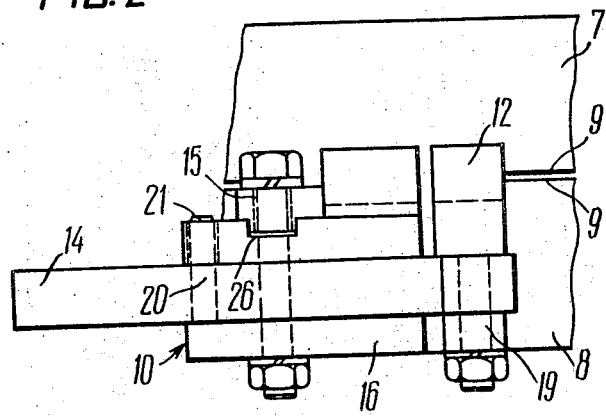
FIG. 3 is a view in the direction of the Arrow A of FIG. 2.

The front rest 10 is made in the form of a lever 14 (FIGS. 2 and 3) having a pivot pin 15 supported by a bracket 16 which is held by screws 17 to the lower part 8 of the fixture 6. The pivot pin 15 is positioned square with the direction of the movement of the saw blade "a" and, therefore, the lever 14 can turn in a plane parallel to the side surfaces of the saw blade "a."

The arm of the lever 14 which is near the grinding wheel 3 carries the supporting element 12 with the inclined pad 13 made of hard alloys. To mount the supporting element 12, the lever 14 is provided with a slot 18 through which passes a pin 19 of the supporting element 12.

This method of mounting the supporting element 12 on the lever 14 enables the inclination of the pad 13 relatively to the direction of the pitch feed and the distance between the pad 13 and the lower part 8 of the fixture 6 to be changed in accordance with the form and size of the saw teeth "b."

In order to make it possible to vary the length of the arm carrying the supporting element 12, the lever 14 is provided with an additional hole 20 to receive the pivot pin 15 of the lever 14. The variation of the arm length is resorted to in the cases where the saw blade retardation distance in the pitch feed has to be changed.

The hole 20 can also serve to secure the lever 14 fixedly, i.e. to prevent the lever from rotation. For the purpose the lever 14 is rigidly connected to the bracket 16 by installing a screw 21 into the hole 20 and into an appropriate hole provided in the bracket 16.

The other arm of the lever 14, remote from the grinding wheel 3, is loaded by a spring 22 one end of which bears on the lever 14, whilst the other end rests against a plug 33 which is located in a hole 24 provided in the lower part 8 of the fixture 6 and contacts a screw 25 by means of which the tension of the spring 22 is adjusted.

Provision of an inclined pad on the arm of the lever 14, which is adapted to turn in a plane parallel to the direction of the pitch feed, makes it possible to retard the saw blade and, as the inclination of the pad 13 increases, to release and push it backward opposite to the direction of the pitch feed.

Mounted on the bracket 16 is an additional supporting element 26 with a pad designed to make contact with the tips of the saw teeth and positioned parallel to the direction of the saw blade movement. This pad serves as a guide for the saw teeth.

Figure 5:
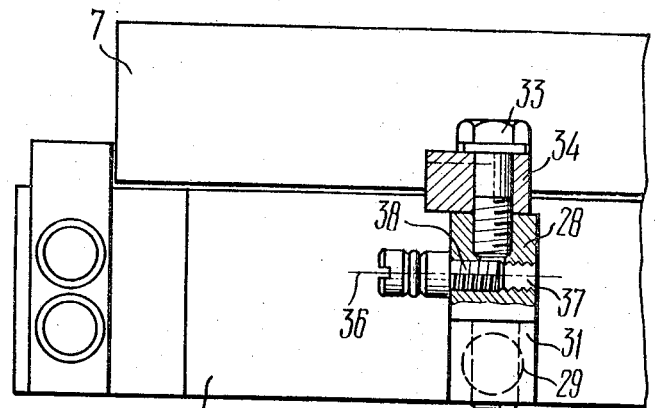
FIG. 5 is a view in the direction of the arrow B of FIG. 4.
Figure 4:
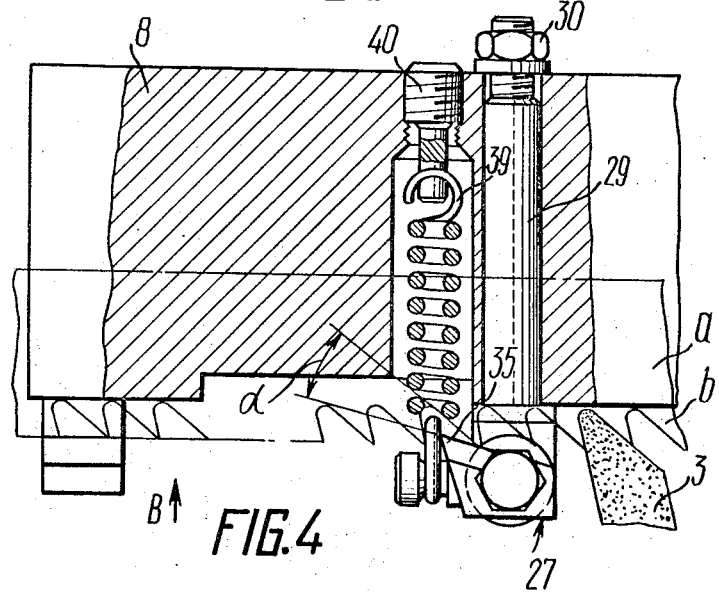
FIG. 4 is a partially cutaway top view of the second embodiment of the front rest.

In the cases where more metal has to be ground away from the forward edges of the saw teeth than from the back ones, it is advantageous to fit the machine with a front rest 27 (FIGS. 4 and 5) which essentially comprises a shaft 28 movably mounted so that it can turn square with the direction of the pitch feed. For the purpose a bracket 31 is attached to the lower part 8 of the fixture 6 by means of a bolt 29 and a nut 30. A hole provided in the bracket 31 receives a trunnion 32 of the shaft 28. Attached to the opposite end of the shaft 28 by means of a screw 33 is a supporting element 34 which carries an inclined pad 35 made of hard alloys.

The inclined pad 35 is mounted on the shaft 28 so that it turns together with the latter in a plane parallel to the direction of pitch feed.

The shaft 28 has a hole 37 which is positioned square with the longitudinal axis 36 of the shaft 28 and receives a pin 38. Engaged with the pin 38 is one end of a spring 39 the other end of which is engaged with an adjusting screw 40 fitted in the lower part 8 of the fixture 6.

When the inclined pad 35 is in the initial position, its top enters the space between the adjacent teeth "b" of the saw blade "a."

Prior to installing the saw blade "a," the inclined pad 35 is positioned so that its top touches the fixture 6.

In order to obtain surface strengthening of the tooth tips during the sharpening process and at the same time to improve the surface finish, the inclined pad 13 (35) should be installed so that it makes an angle $\alpha = 0°30$ to $15°$ with the back edge of the tooth "b." The angle $\alpha$ is to be chosen in accordance with the required tooth shape and the length $h$ (FIG. 6) of the tooth tip portion formed by the planishing action of the inclined pad 13 (35). The length h may vary from 0.5 to 2 mm.

The band saw sharpening machine operates as follows:

By moving a handle 41, which is connected to an eccentric 42 located on the upper part 7 of the fixture 6, said upper part 7 is turned on pivots 43. Thereafter the saw blade "a" is placed on the guides provided in the lower part 8 and is seated on the rests 10 and 11, with the tips of the saw teeth "b" bearing upon these rests. The upper part 7 is lowered onto the side surface of the saw blade "a" and the position of the saw balde "a" in relation to the rests 10 and 11 is fixed by operating a handwheel 44. Thereby the saw blade "a" is clamped on its side and back surfaces.

Now, by using a crank gear 45, the amount of in-feed of the saw blade "a" is set according to the height of the saw teeth. The pitch of the longitudinal feed of the saw blade "a" is automatically set simultaneously with setting the in-feed. It will be noted that the pitch of the saw blade longitudinal feed should be greater than the pitch of the saw teeth. This condition is necessary for the cutting force to move the saw blade in the direction opposite to the pitch feed by an amount not exceeding one pitch of the saw teeth.

A slide 46, a holder 47 and a pawl 48 are components of the pitch-feed mechanism 5.

After the saw blade "a" has been clamped in position and the feed mechanisms 4 and 5 have been set up, the sharpening machine drive (not shown), which operates these mechanisms, and the grinding mechanism 2, which rotates the grinding wheel 3, are put into operation.

As the saw blade "a" is pitch-fed to the grinding wheel 3, one of the saw teeth located in the zone of the front rest 10 commences to retard the saw blade "a" by reason of moving on the inclined pad 13, the latter moving clockwise. The clockwise movement of the pad 13 is accompanied by the movement of the end of the lever 14, the other end of this lever compressing the spring 22.

When setting up the band saw sharpening machine, the inclined pad 13 is to be set so that the angle $\alpha$ between the pad 13 and the rear edge of the saw tooth "$b$" is from 0°30' to 15°, depending on the required tooth shape. At the end of the contact between the tooth "$b$" and the inclined pad 13 the angle $\beta$ between said pad and the straight line passing through the tips of the saw teeth increases to the predetermined value and the retardation of the saw blade "$a$" ceases.

The top end of the inclined pad 13 gets into the space between the saw tooth which has just left the pad and the one which is bearing thereupon. By acting on the back edge of the latter tooth, the inclined pad 13 commences to force the saw blade "$a$" back, towards the grinding wheel 3.

At the same time the grinding wheel 3 comes into contact with the saw tooth and the backward force acting on the saw blade "$a$" enables the metal to be uniformly ground off the tooth edges.

This condition occurs due to combination of the horizontal component of the reactive force of the grinding wheel 3 and the horizontal component of the reactive force arising on the inclined pad 13. As the grinding wheel 3 moves along the tooth edge being sharpened, its horizontal component increases and the horizontal component of the inclined pad 13 decreases by reason of decrease in the angle $\beta$. As a result, the backward force exerted on the saw blade in the direction opposite to the pitch feed remains constant.

The action of the inclined pad 13 on the back edge of the saw tooth also produces a planishing effect on the tip of the tooth involved. This planishing effect produces surface strengthening of the tooth metal and gives a surface finish approximately two or three classes finer than that obtainable with the band saw sharpening machines known hitherto.

When using the front rest 27, which is constructed essentially by the employment of the shaft 28, the band saw sharpening machine operates in a similar way.

In this case the horizontal component of the reactive force arising on the inclined pad 35 increases with increase in the pad inclination and, consequently, increases the backward force acting on the saw blade in the direction opposite to the pitch feed. As a result, a greater amount of metal is ground off from the forward edge of the tooth being sharpened.

To increase the depth of the surface strengthening and the length of the strengthened portion $h$ of the tooth tip, and also to improve the surface finish of this portion, additional front rests may be installed one after the other along the saw blade.

An experimental band saw sharpening machine constructed in accordance with the present invention, with the front rest pad inclined at an angle $\alpha=2°$, has produced, when operated at a rate of 420 teeth per minute, a surface finish of Class 8 to 9 over a length $h$ of about 1 mm, i.e. two to three classes finer than the finish produced by the machines known hitherto.

What is claimed is:

1. A band saw sharpening machine comprising: a bed; a grinding mechanism including a grinding wheel and mounted on said bed; an in-feed mechanism for moving the saw blade transversely to said grinding wheel, said in-feed mechanism being mounted on said bed; a pitch-feed mechanism for moving the saw blade longitudinally to said grinding wheel, said pitch-feed mechanism being mounted on said bed and kinematically connected with said in-feed mechanism; a resilient fixture for clamping the saw blade on the side and back surfaces, said resilient fixture being mounted on said bed; at least two rests provided for the tips of the saw teeth to bear upon and attached to said resilient fixture; the front rest, which is located behind said grinding wheel as viewed in the direction of the pitch feed, being spring-loaded parallel to the side surface of the saw blade and having a pad positioned at an acute angle, in the direction of the pitch feed, to the straight line passing through the tips of the saw teeth, which pad successively interacts with the tip of each tooth in order to retard the saw blade during pitch feed, said front rest with the pad attached thereto being mounted on said fixture so that the inclination of said pad in the direction of the pitch feed can be changed by the effect of the saw teeth acting thereupon during the saw sharpening process.

2. A band saw sharpening machine as claimed in claim 2, in which the front rest is made in the form of a lever pivoted on a pin positioned square with with the direction of the saw blade movement and supported by a bracket rigidly secured to the fixture, one arm of said lever carrying a movably mounted pad and the other arm being spring-loaded parallel to the side surface of the saw blade.

3. A saw band sharpening machine as claimed in claim 2, in which the lever is mounted so that the length of the arm carrying the pad can be varied, for which purpose the bracket is provided with additional holes to receive the lever pivot pin.

4. A band saw sharpening machine as claimed in claim 1, in which the front rest is essentially a shaft mounted square with the direction of the saw blade movement and carrying a movably mounted pad.

5. A band saw sharpening machine as claimed in claim 1, in which the pad is mounted on the rest so that there is an angle from 0°30' to 15° between said pad and the back edge of the saw tooth.

* * * * *